United States Patent
Seok

(10) Patent No.: US 8,565,207 B2
(45) Date of Patent: *Oct. 22, 2013

(54) DIRECT LINK SETUP PROCEDURE IN TUNNELED DIRECT LINK SETUP WIRELESS NETWORK AND STATION SUPPORTING THE PROCEDURE

(71) Applicant: LG Electronics Inc., Seoul (KR)

(72) Inventor: Yong Ho Seok, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/753,445

(22) Filed: Jan. 29, 2013

(65) Prior Publication Data

US 2013/0142189 A1    Jun. 6, 2013

Related U.S. Application Data

(63) Continuation of application No. 13/479,034, filed on May 23, 2012, now Pat. No. 8,391,266, which is a continuation of application No. 12/233,507, filed on Sep. 18, 2008, now Pat. No. 8,208,451.

(60) Provisional application No. 60/973,444, filed on Sep. 18, 2007, provisional application No. 61/049,476, filed on May 1, 2008, provisional application No. 61/095,609, filed on Sep. 9, 2008.

(51) Int. Cl.
   *G06F 15/16*    (2006.01)
   *H04W 4/00*    (2009.01)
   *H04W 76/02*    (2009.01)
   *H04W 28/16*    (2009.01)

(52) U.S. Cl.
   CPC ............ *H04W 76/023* (2013.01); *H04W 76/02* (2013.01); *H04W 76/021* (2013.01); *H04W 76/022* (2013.01); *H04W 76/025* (2013.01); *H04W 28/16* (2013.01)
   USPC ........................... 370/338; 709/230; 709/236

(58) Field of Classification Search
   CPC .. H04W 76/023; H04W 76/025; H04W 28/16
   USPC ................................... 370/338; 709/230, 236
   See application file for complete search history.

(56) References Cited

U.S. PATENT DOCUMENTS 7,251,235 B2    7/2007    Wentink
8,374,123 B2    2/2013    Wentink
(Continued)

FOREIGN PATENT DOCUMENTS

JP        2007-060029      3/2007
KR    10-2006-0099473      9/2006
(Continued)

OTHER PUBLICATIONS

U.S. Appl. No. 12/433,475, Final Office Action dated Apr. 24, 2013, 20 pages.

(Continued)

*Primary Examiner* — Ayaz Sheikh
*Assistant Examiner* — Tarell Hampton
(74) *Attorney, Agent, or Firm* — Lee, Hong, Degerman, Kang & Waimey

(57) ABSTRACT

Provided are a Tunneled Direct Link Setup (TDLS) establishment procedure for a TDLS initiator and a station supporting the establishment procedure. In the establishment procedure, a requesting Non-AP QSTA transmits a TDLS setup request frame via an access point (AP) to an intended peer Non-AP QSTA. And, the requesting Non-AP QSTA receives a TDLS setup response frame via the AP from the intended peer station in response to the TDLS setup request frame. And, the requesting Non-AP QSTA transmits a TDLS setup confirm frame via the AP to the intended peer station in response to the TDLS setup response frame.

6 Claims, 12 Drawing Sheets

(56) References Cited

U.S. PATENT DOCUMENTS

| | | |
|---|---|---|
| 2004/0246934 A1 | 12/2004 | Kim |
| 2005/0036469 A1 | 2/2005 | Wentink |
| 2005/0053015 A1 | 3/2005 | Jin et al. |
| 2006/0221879 A1 | 10/2006 | Nakajima et al. |
| 2006/0248429 A1 | 11/2006 | Grandhi et al. |
| 2007/0171858 A1 | 7/2007 | Grandhi et al. |
| 2008/0031209 A1 | 2/2008 | Abhishek et al. |
| 2008/0069047 A1 | 3/2008 | Yee et al. |
| 2008/0225756 A1 | 9/2008 | Amann et al. |
| 2008/0304444 A1 | 12/2008 | Soomro |
| 2009/0073945 A1 | 3/2009 | Seok |
| 2009/0231995 A1 | 9/2009 | Chu et al. |
| 2012/0230316 A1 | 9/2012 | Seok |

FOREIGN PATENT DOCUMENTS

| | | |
|---|---|---|
| WO | 2005/067535 | 7/2005 |
| WO | 2006/099025 | 9/2006 |
| WO | 2007-055993 | 5/2007 |
| WO | 2007/067000 | 6/2007 |

OTHER PUBLICATIONS

IEEE Computer Society et al., "IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 8: Medium Access Control (MAC) Quality of Service Enhancements," IEEE Std 802.11e, Nov. 2005.

N. Choi et al., "Half Direct-Link Setup (H-DLS) for Fairness between External and Local TCP Connections in IEEE 802.11e Wireless LANs", IEEE International Conference on Communications, pp. 4500-4505, Jun. 2007.

Wentink et al., "New DLS (nDLS)", IEEE 802.11 DLS SG, document 802.11-07/0478rO, 2007.

FIG. 2

| TDLS Type Value | Meaning |
|---|---|
| 0 | TDLS Setup Request |
| 1 | TDLS Setup Response |
| 2 | TDLS Setup Confirm |
| 3 | TDLS Teardown Request |
| 4 | TDLS Teardown Response |
| 5 | TDLS Tx Path Switch Request |
| 6 | TDLS Tx Path Switch Responce |
| 7 | TDLS Rx Path Switch Request |
| 8 | TDLS Rx Path Switch Responce |
| 9 | Peer Traffic Indication |
| 9-255 | Reserved |

FIG. 6

| Order | Information |
|---|---|
| 1 | Link Identifier |
| 2 | Association Request frame body |
| 3 | Dialog Token |
| 4 | RSNIE_I |
| 5 | SMK Message 1 FTIE |
| 6 | DH_I |

FIG. 7

| Transmitter Address | Receiver Address | BSSID | SSID | DLS Timeout |

FIG. 8

| Order | Information |
|---|---|
| 1 | Link Identifier |
| 2 | Status Code |
| 3 | Association Request frame body |
| 4 | Dialog Token |
| 5 | RSNIE_P |
| 6 | SMK Message 2 FTIE |
| 7 | DH_P |

DIRECT LINK SETUP PROCEDURE IN TUNNELED DIRECT LINK SETUP WIRELESS NETWORK AND STATION SUPPORTING THE PROCEDURE

CROSS-REFERENCE TO RELATED PATENT APPLICATIONS

This application is a continuation of U.S. application Ser. No. 13/479,034, filed May 23, 2012, now U.S. Pat. No. 8,391,266, which is a continuation of U.S. application Ser. No. 12/233,507, filed Sep. 18, 2008, now U.S. Pat. No. 8,208,451, which pursuant to 35 U.S.C. §119(a), claims the benefit of U.S. Provisional Application Ser. Nos. 60/973,444, filed on Sep. 18, 2007, 61/049,476, filed on May 1, 2008, and 61/095,609, filed on Sep. 9, 2008, the disclosures of all of which are incorporated by reference herein in their entireties.

BACKGROUND

1. Field of the Invention

The present invention relates to a wireless local access network (WLAN), and more particularly, to a direct link setup procedure in a tunneled direct link setup (TDLS) wireless network and a station supporting the direct link setup procedure.

2. Description of the Related Art

With the development of information communication technology, a variety of wireless communication technology has been developed. A wireless LAN (WLAN) is a technique permitting wireless access to its local network or Internet in specific service areas such as home or companies or air planes by the use of portable terminals such as a personal digital assistant (PDA), a laptop computer, and a portable multimedia player (PMP) on the basis of the radio communication technology.

These days, thanks to the increased availability of WLANs, portable terminal users such as laptop computer users are able to perform their tasks with increased mobility. For example, a user can take his laptop computer from his desk into a conference room to attend a meeting and still have access to his local network to retrieve data and have access to the Internet via one or more modems or gateways present on the local network without being tethered by a wired connection. Similarly, business travelers commonly use their portable terminals to gain access to their email accounts, to check if there is any unread email, and to read and send email.

In the initial WLAN technology, a data rate of 1 to 2 Mbps was supported by the use of frequency hopping, spread spectrum, and infrared communication using a frequency of 2.4 GHz. In recent years, with the development of the wireless communication technology, 54 Mbps in maximum can be supported by applying the Orthogonal Frequency Division Multiplex (OFDM) technology, etc. to the WLAN. In addition, the IEEE 802.11 has developed or is developing wireless communication technologies for improvement in quality of service (QoS), compatibility of an access point (AP) protocol, security enhancement, wireless resource measurement, wireless access in vehicular environment, fast roaming, mesh network, inter-working with external networks, wireless network management, and the like.

In the IEEE 802.11, a Basic Service Set (BSS) means a set of stations (STAs) successfully synchronized. A Basic Service Area (BSA) means an area including members of the BSS. The BSA can vary depending on propagation characteristics of a wireless medium and thus it may contain members of other basic service sets.

The BSS can be basically classified into two kinds of an independent BSS (IBSS) and an infra-structured BSS. The former means a BSS that constitutes a self-contained network and that is not permitted to access a Distribution System (DS). The latter means a BSS that includes one or more Access Points (APs) and a distribution system and that uses the APs in all the communication processes including communications between the Non-AP stations.

In the initial WLAN communication procedure, it was required that data is necessarily transmitted through the AP in the infra-structured BSS. That is, the direct transmission of data between non-AP stations (non-AP STAs) is not allowed in the infra-structured BSS. In recent years, a direct link setup (DLS) between the non-AP STAB supporting Quality of Service (QoS) has been introduced to improve the efficiency of wireless communications. Accordingly, in the BSS supporting the QoS, that is, in the QBSS including QoS STAs (QSTA) and QoS APs (QAP), the non-AP STAs can set up a direct link therebetween and directly communicate with each other through the direct link.

SUMMARY OF THE INVENTION

As described above, the existing DLS setup procedure is based on the premise that the BSS is the QBSS, which is a BSS supporting the QoS. In the QBSS, the AP as well as the non-AP STA is a QAP, which is an AP supporting the QoS. In the most WLAN environments currently used (for example, WLAN environments in accordance with the IEEE 802.11a/b/g), the non-AP STAs are QSTAs supporting the QoS but the APs are legacy APs not supporting the QoS. As a result, in the WLAN environments currently used, there exists a limitation that even a QSTA cannot utilize the DLS service.

A TDLS (Tunneled Direct Link Setup) is a wireless communication protocol newly suggested to overcome such a limitation regarding the existing DLS service. The TDLS allows the QSTAs to set up a direct link in the currently used WLAN environments in accordance with the IEEE 802.11a/b/g. Accordingly, the TDLS defines procedures of allowing the QSTAs to set up a direct link even in the BSS managed by the legacy AP. Hereinafter, a wireless network supporting the TDLS procedure is referred to as a TDLS wireless network.

In the TDLS wireless network, it is first necessary to specifically define a procedure of setting up a direct link between two non-AP QSTAs. Particularly, in the TDLS wireless network, an AP does not support the direct link setup procedure and thus does not directly participate in the setup procedure of the direct link. Accordingly, there is a need for efficiently and reliably enabling the direct link setup procedure.

And, in the communication between non-AP QSTAs through the direct link set up, it is necessary to allow the QoS facilities of the non-AP QSTAs to work properly. In addition, when the non-AP QSTAs support High Throughput (HT) capabilities of IEEE 802.11n, it is preferable to allow the HT facilities of the non-AP QSTAs to work properly.

Accordingly, a goal of the invention is to provide a direct link setup procedure in a TDLS wireless network with high reliability and a station supporting the direct setup procedure.

Another goal of the invention is to provide a direct link setup procedure in a TDLS wireless network that can allow two non-AP QSTAs intending to set up a direct link therebetween to be consistent in completion of the direct link setup and a station supporting the direct setup procedure.

Still another goal of the invention is to provide a direct link setup procedure in a TDLS wireless network that can allow the QoS capabilities and/or the HT capabilities to properly operate in a communication between non-AP QSTAs having set up a direct link therebetween and a station supporting the direct setup procedure.

According to an aspect of the invention, there is provided a Tunneled Direct Link Setup (TDLS) establishment procedure for a TDLS initiator, the procedure comprising: transmitting a TDLS setup request frame via an access point (AP) to an intended peer station; receiving a TDLS setup response frame via the AP from the intended peer station in response to the TDLS setup request frame; and transmitting a TDLS setup confirm frame via the AP to the intended peer station in response to the TDLS setup response frame.

According to another aspect of the invention, there is provided a procedure for establishing a direct link in Tunneled Direct Link Setup (TDLS) wireless network, the procedure is characterized in that: first station which initiates establishment procedure of the direct link transmits a TDLS setup confirm frame in response to the TDLS setup response frame received from the second station via an access point (AP) to second station which in involved in the establishment procedure of the direct link, and the TDLS setup confirm frame includes an EDCA (Enhanced Distributed Channel Access) parameter set information element and/or HT (High Throughput) operation information element.

According to still another aspect of the invention, there is provided a Tunneled Direct Link Setup (TDLS) establishment procedure for an intended peer station of a TDLS initiator, the procedure comprising: receiving a TDLS setup request frame via an access point (AP) from the TDLS initiator; transmitting a TDLS setup response frame via the AP to the TDLS initiator in response to the TDLS setup request frame; and receiving a TDLS setup confirm frame via the AP from the TDLS initiator in response to the TDLS setup response frame.

According to still further another aspect of the invention, there is provided a station for supporting Tunneled Direct Link Setup (TDLS) in a wireless local access network, the station comprising: a processor configured to generate and process frames; and a transceiver operably connected to the processor and configured to transmit and receive the frames for the processor, wherein the station is configured to transmit a TDLS setup request frame via an access point (AP) to an intended peer station, to receive a TDLS setup response frame via the AP from the intended peer station in response to the TDLS setup request frame; and to transmit a TDLS setup confirm frame via the AP to the intended peer station in response to the TDLS setup response frame.

According to still further another aspect of the invention, there is provided a station for supporting Tunneled Direct Link Setup (TDLS) in a wireless local access network, the station comprising: a processor configured to generate and process frames; and a transceiver operably connected to the processor and configured to transmit and receive the frames for the processor, wherein the station is configured to receive a TDLS setup request frame via an access point (AP) from a TDLS initiator, to transmit a TDLS setup response frame via the AP to the TDLS initiator in response to the TDLS setup request frame; and to receive a TDLS setup confirm frame via the AP from the TDLS initiator in response to the TDLS setup response frame.

BRIEF DESCRIPTION OF THE DRAWINGS

FIG. 2 is a diagram illustrating types of the TDLS frame and values corresponding thereto.
FIG. 6 is a diagram illustrating information included in an information field of the TDLS setup request frame.
FIG. 7 is a block diagram illustrating a format of a link identifier field included in the TDLS setup request frame.
FIG. 8 is a diagram illustrating information included in an information field of a TDLS setup response frame.

DESCRIPTION OF THE EXEMPLARY EMBODIMENTS

Figure 1:
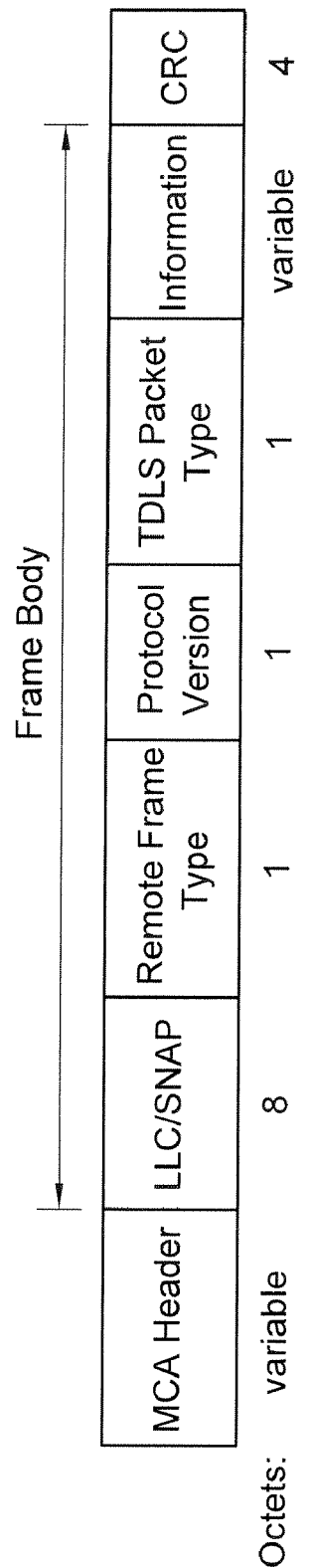
FIG. 1 is a diagram illustrating a format of a TDLS frame.

Hereinafter, exemplary embodiments of the invention will be described in detail with reference to the accompanying drawings.

In a TDLS wireless network to which embodiments of the invention can be applied, non-AP QSTAs (hereinafter, simply referred to as "QSTA") associated with a legacy AP not supporting the QoS can set up a direct link therebetween and can tear down the direct link. One QSTA should be able to transmit and receive management action frames for setting up and tearing down a direct link through the legacy AP to set up a direct link with another QSTA or to tear down a direct link with a peer QSTA. However, there is a problem in that the legacy AP cannot support the procedure for setting up or tearing down the direct link between two QSTAs in accordance with an existing DLS procedure of IEEE 802.11e.

One method for solving such a problem is to encapsulate the management action frames regarding the direct link setup/ teardown procedure in the form of a data frame and to transmit the encapsulated management action frames to the peer QSTA. According to this method, the legacy AP performs only a function of relaying the management action frames, as if it relay a data frame between two non-AP QSTAs. As a result, the legacy AP does not participate in the procedures of setting up, managing, and tearing down a TDLS link. The embodiments of the invention to be described later can be usefully applied to a TDLS wireless network in which the management action frames for setting up, tearing down, and managing the TDLS link are encapsulated in the form of a data frame and are transmitted through an AP. Here, the AP is not limited to the legacy AP, but may be a QAP supporting the DLS.

Among the devices constituting a TDLS wireless network system, a non-AP STA is a device including a physical layer interface for a wireless medium and a medium access control (MAC) in accordance with the standard of IEEE 802.11. The non-AP STA may be called a wireless transmission/reception unit (WTRU), a user equipment (UE), a mobile station (MS), or a mobile subscriber unit. A non-AP STA supporting the quality of service (QoS) is simply referred to as a non-AP QSTA or QSTA.

The non-AP STA includes a processor and a transceiver and may further include a user interface and a display. The processor is a functional unit designed to generate frames to be transmitted through a wireless network or to process frames received through the wireless network, and performs a variety of functions of controlling the corresponding station and processing signals input by and for a user. The transceiver is functionally connected to the processor and is a unit designed to transmit and receive frames through the wireless network.

The AP is a functional entity having a wireless station function and providing access to a distribution system via a wireless medium for an associated non-AP STA. According to the present embodiment, the AP may be a legacy AP not supporting the QoS, but is not limited to the legacy AP. The AP may be called a convergence controller, a base station (BS), a node-B, or a site controller.

FIG. 1 is a diagram illustrating a format of a MAC frame (hereinafter, referred to as a "TDLS frame") which a QSTA to set up a direct link or to have set up the direct link in a TDLS wireless network transmits and receives to and from an opposite QSTA (or a peer QSTA) through an AP. Referring to FIG. 1, the TDLS frame includes a MAC header field, a logical link control (LLC)/sub-network access protocol (SNAP) field, a remote frame type field, a TDLS packet type field, an information field, and an error correction (Cyclic Redundancy code: CRC) field. The TDLS frame may further include a protocol version field.

The MAC header field includes information common to almost all the types of frames. For example, the MAC header field includes a frame control field, a duration/ID field, plural address fields (Address1, Address2, Address3, and Address4), a sequence control field, and/or a QoS control field.

The frame control field includes a protocol version field, a type and subtype field for identifying a function of the frame, a more fragment field indicating whether a more fragment subsequent to a current MSDU or MMPDU exists, a retry field indicating that the frame is a frame to be re-transmitted, and a power management field indicating a power save mode. The power management field of the frame control field indicates a mode where the STA operates after it successfully completes the exchange of a series of frames. For example, when the power management field is set to "0", it indicates that the STA transmitting the frame operates in an active mode. However, when the power management field is set to "1", it indicates that the transmitting STA operates in a peer power save mode.

The QoS control field is used to identify various QoS-related information that varies depending on a traffic category (TC) or a traffic stream (TS) to which the frame belongs and a frame type and subtype. The QoS control field can exist in all the TDLS frames in which a QoS subfield of a subtype field of the frame is set to "1." The respective QoS control field includes five subfields and usage and various possible layouts of the subfields are shown in Table 1.

TABLE 1

| Applicable Frame (sub) Types | Bits 0-3 | Bit 4 | Bits 5-6 | Bit 7 | Bits 8-15 |
|---|---|---|---|---|---|
| QoS (+)CF-Poll frames sent by HC | TID | EOSP | Ack Policy | Reserved | TXOP limit |

TABLE 1-continued

| Applicable Frame (sub) Types | Bits 0-3 | Bit 4 | Bits 5-6 | Bit 7 | Bits 8-15 |
|---|---|---|---|---|---|
| QoS Data, QoS Null, and QoS Data + CF-Ack frames sent by HC | TID | EOSP | Ack Policy | Reserved | AP PS Buffer State |
| QoS data frames sent by non-AP to an AP | TID | 0 | Ack Policy | Reserved | TXOP Duration Requested |
|  | TID | 1 | Ack Policy | Reserved | Queue Size |
| QoS Data, QoS Null, and QoS Data + CF-Ack frames sent over the direct link | TID | EOSP | Ack Policy | Reserved | Reserved |

Referring to FIG. 1, the LLC/SNAP field includes an LLC/SNAP header. The remote frame type field is set to a value (for example, "2") indicating the TDLS frame. The protocol version field is set to a value indicating a protocol version of a transmitted/received message.

The TDLS packet type field is set to a value specifying a type of the TDLS frame. Examples of the types of the TDLS frame and the corresponding values are shown in FIG. 2. Referring to FIG. 2, the TDLS frame includes a TDLS setup request frame, a TDLS setup response frame, a TDLS setup confirm frame, a TDLS teardown request frame, and a TDLS teardown response frame.

The information field of the TDLS frame includes a variety of information individually specified depending on the types of the TDLS frames. The included information varies depending on the TDLS types. The error correction field (CFC) includes additional information for correcting an error of the frame.

A direct link setup procedure in a TDLS wireless network according to an embodiment of the invention will be described now.

It can be considered that the direct link setup procedure in the QBSS is similarly employed as the direct link setup procedure in the TDLS wireless network. According to the direct link setup procedure in the QBSS, the direct link setup procedure is completed by a two-way handshake between two QSTAs.

Figure 3:
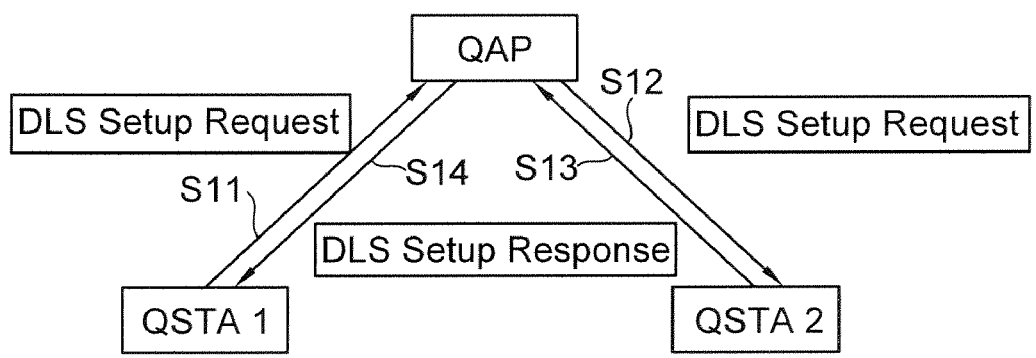
FIG. 3 is a diagram illustrating a flow of messages in a direct link setup procedure in a QBSS.

FIG. 3 is a diagram illustrating a flow of messages in the direct link setup procedure in the QBSS. Referring to FIG. 3, first, a first QSTA (QSTA1) intending to set up a direct link transmits to a QAP a direct link setup request message for a second QSTA (QSTA2) (S11). The QAP having confirmed that the received message is the direct link setup request message transmits the direct link setup request message from the first QSTA to the second QSTA (S12). The second QSTA transmits a message in response to the received direct link setup request message, for example, a direct link setup response message, to the QAP (S13). The QAP having confirmed that the received message is a response message responsive to the request message in step S11 transmits the direct link setup response message from the second QSTA to the first QSTA (S14).

According to the direct link setup procedure in FIG. 3, the QAP directly participates therein and relays the exchange of the direct link setup request and response messages between the first QSTA and the second QSTA, thereby completing the direct link setup procedure. In the QBSS, the reliability and consistency of the direct link setup procedure can be guaranteed by once exchange of messages. This is because the QAP supporting the DLS procedure can guarantee the exchange of messages for setting up a direct link between the first QSTA and the second QSTA, the QAP can notify the first QSTA and/or the second QSTA of a fact that the exchange of messages fails, or the QAP can initiatively end the direct link setup procedure.

More specifically, in the direct link setup procedure in the QBSS, the QAP-initiated operation is possible when there is a problem in the direct link setup procedure (S11 to S14) shown in FIG. 3. For example, when the transmission in step S12 fails, the QAP can transmit a direct link setup request message to the second QSTA again or can otherwise transmit a direct link teardown request message to the first QSTA. Alternatively, when the transmission in step S13 fails, the QAP can transmit a direct link teardown request message to the first QSTA and the second QSTA. Alternatively, when the transmission in step S14 fails, the QAP can transmit the direct link setup response message from the second QSTA again.

Accordingly, in the QBSS, the reliable direct link setup procedure can be performed between the first QSTA and the second QSTA only by the exchange of the direct link setup request message and the direct link setup response message (that is, the two-way handshake) between the first QSTA and the second QSTA.

Figure 4:
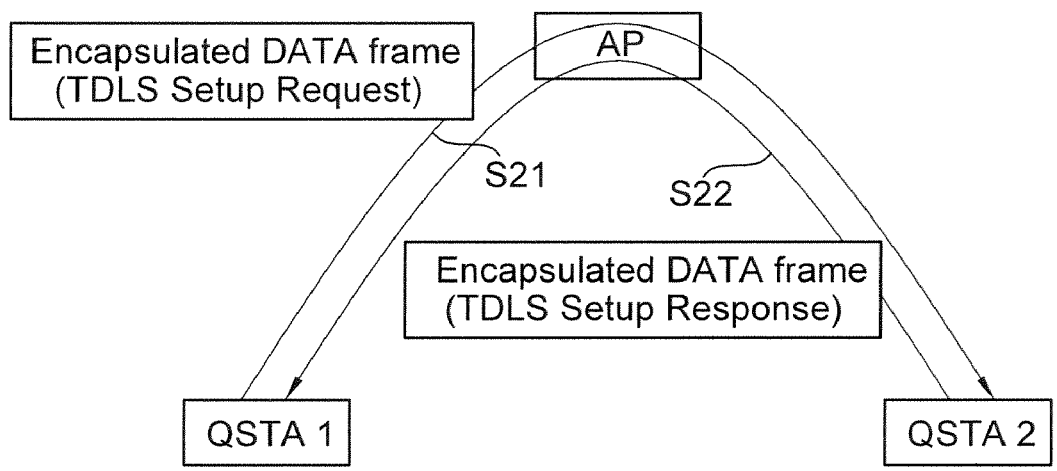
FIG. 4 is a diagram illustrating a flow of messages in a direct link setup procedure when the direct link setup procedure shown in FIG. 3 is applied to a TDLS wireless network without any change.

FIG. 4 is a diagram illustrating a flow of messages in the direct link setup procedure when the direct link setup procedure (that is, the two-way handshake procedure) shown in FIG. 3 is applied to the TDLS wireless network. The TDLS wireless network system includes at least two non-AP QSTAs (QSTA1 and QSTA2) and a legacy AP not supporting the DLS procedure. For the purpose of convenient explanation in the following description, the non-AP QSTA initiating the direct link setup procedure, that is, transmitting the TDLS setup request frame, is called an initiating QSTA or a TDLS initiator and the non-AP QSTA related to the direct link setup procedure with the TDLS initiator or setting up a direct link thereto is called a peer QSTA.

Referring to FIG. 4, the first QSTA (QSTA1) as the TDLS initiator intending to set up a direct link to the second QSTA2 as the peer STA transmits to the second QSTA a request message for requesting for setting up a direct link (S21). The request message may be a TDLS setup request frame. The AP simply relays the request message received from the first QSTA to the second QSTA. The second QSTA having received the TDLS setup request frame transmits a response message to the first QSTA in response to the TDLS setup request frame (S22). The response message may be a TDLS setup response frame. In this case, the AP simply relays the response message received from the second QSTA to the first QSTA.

In the direct link setup procedure in the TDLS wireless network, an AP-initiated operation is not possible. That is, even when the transmission (including the relay in the AP) in step S21 and/or step S22 fails, the AP cannot initiatively transmit the failed frame again or the direct link teardown request frame to the non-AP QSTA.

In the direct link setup procedure shown in FIG. 4, when the response message transmitted in step S22 is not successfully relayed from the AP to the first QSTA, a difference may occur in recognition of the first QSTA and the second QSTA on the completion of the direct link setup procedure. More specifically, the first QSTA not having received the response message may recognize that the direct link is not successfully set up but the second QSTA having transmitted the response message may recognize that the direct link is successfully set up. As a result, in the two-way handshake direct link setup procedure shown in FIG. 4, it is difficult to guarantee the reliability of the procedure when it is applied to the TDLS wireless network.

In order to solve this problem that can occur in the two-way handshake direct link setup procedure, a first embodiment of the invention employs a three-way handshake direct link setup procedure. More specifically, in addition to the above-mentioned two-way handshake direct link setup procedure, a process of allowing the TDLS initiator to transmit to the peer STA a confirm message indicating that the TDLS setup response frame is successfully received, for example, a TDLS setup confirm frame, is further performed. This will be described now in detail.

Figure 5:
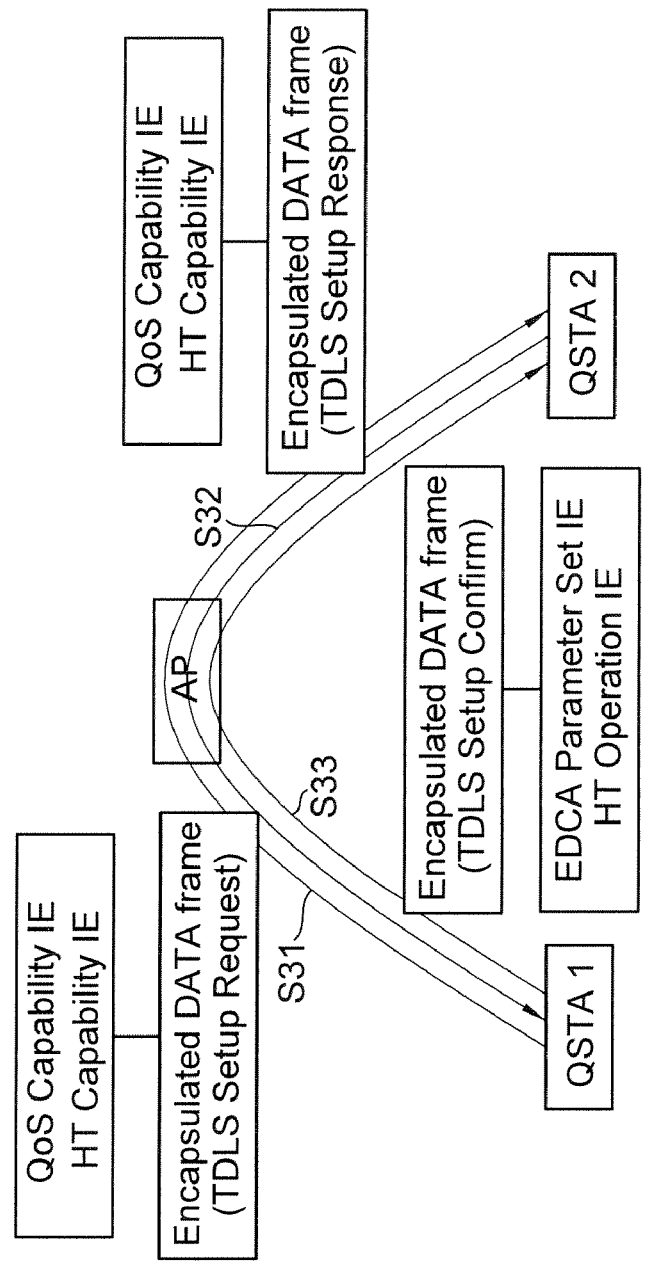
FIG. 5 is a diagram illustrating a flow of messages in a direct link setup procedure in a TDLS wireless network according to a first embodiment of the invention.

FIG. 5 is a diagram illustrating a flow of messages in a direct link setup procedure in the TDLS wireless network according to the first embodiment of the invention. The TDLS wireless network system includes at least two non-AP QSTAs (hereinafter, simply referred to as "QSTA") and a legacy AP not supporting the QoS.

Referring to FIG. 5, the first QSTA (QSTA1), that is, the TDLS initiator, intending to set up a direct link to the second QSTA (QSTA2) as the peer STA transmits a request message for requesting for setting up a direct link, for example, a TDLS setup request frame, to the second QSTA through the AP (S41). In this step, the AP simply relays the TDLS setup request frame. The TDLS setup request frame may be a frame in which the TDLS packet type field of the TDLS frame shown in FIG. 1 is set to a value indicating the TDLS setup request. Accordingly, in step S41, the TDLS setup request is encapsulated in the form of a data frame and is then transmitted to the second QSTA through the AP.

FIG. 6 shows information included in the information field of the TDLS setup request frame (in the information field of the TDLS frame shown in FIG. 1). Referring to FIG. 6, the information field of the TDLS setup request frame includes link ID information, an association request frame body, and dialog token information. Although not shown in FIG. 6, the information field of the TDLS setup request frame may further include capability information or extended capability information.

The capability information included in the TDLS setup request frame comprises QoS capability information and/or HT (High Throughput) capability information. If the first QSTA (QTSA1) supports QoS feature, it includes QoS Capability to the TDLS setup request frame. And, if the first QSTA (QTSA1) supports HT feature, it includes HT Capability to the TDLS setup request frame.

According to an aspect of this embodiment, the link ID information may include BSSID and/or SSID. In the TDLS wireless network, some APs can support plural BSSID and plural SSID. In this case, in order to set up a direct link between the non-AP QSTAs associated with the AP, a specific BSSID and a specific SSID in which the direct link is set up need to be specified in messages (such as a TDLS setup request frame, a TDLS setup response frame, and/or a TDLS setup confirm frame) to be exchanged in the direct link setup procedure.

FIG. 7 is a diagram illustrating a format of the link ID field included in the TDLS setup request frame. Referring to FIG. 7, the link ID field further includes a BSSID subfield and an SSID subfield, in addition to a transmitter address subfield, a receiver address subfield, and a DLS timeout subfield.

Referring to FIG. 5 again, the second QSTA having received the TDLS setup request frame transmits a response message responsive to the TDLS setup request frame, for example, the TDLS setup response message, to the first QSTA through the AP (S42). In this step, the AP simply relays the TDLS setup response frame. In this case, the TDLS setup response frame may be a frame in which the TDLS packet type field of the TDLS frame shown in FIG. 1 is set to a value indicating the TDLS setup response. Accordingly, the TDLS setup response frame is encapsulated in the form of a data frame and is then transmitted to the first QSTA through the AP.

FIG. 8 shows information included in the information field of the TDLS setup response frame (in the information field of the TDLS frame shown in FIG. 1). Referring to FIG. 8, the information field of the TDLS setup response frame includes link ID information, status code information, association request frame body, and dialog token information. In this case, the link ID information may have the format shown in FIG. 7, which is only exemplary. Similarly to the information field of the TDLS setup response frame, the information field of the TDLS setup response frame may further include a capability information element and an extended capability information element, indicating whether the STA transmitting the TDLS setup response frame supports a peer PSM AP mode and/or a peer PSM client mode.

The capability information included in the TDLS setup response frame comprises QoS capability information and/or HT (High Throughput) capability information. If the second QSTA (QTSA2) supports QoS feature, it includes QoS Capability to the TDLS setup response frame. And, if the second QSTA (QTSA2) supports HT feature, it includes HT Capability to the TDLS setup response frame.

Referring to FIG. 5 again, the first QSTA transmits a confirm message, for example, a TDLS setup confirm frame, responsive to the received TDLS setup response frame to the second QSTA through the AP (S43). In this step, the AP simply relays the TDLS setup confirm frame. The TDLS setup confirm frame may be a frame in which the TDLS packet type field of the TDLS frame shown in FIG. 1 is set to a value indicating the TDLS setup confirm. The TDLS setup confirm frame is encapsulated in the form of a data frame and is then transmitted to the second QSTA through the AP.

According to this embodiment of the present invention, the direct link setup procedure is completed after the first QSTA having requested for setting up a direct link transmits the confirm message responsive to the response message received from the second QSTA to the second QSTA. Accordingly, even when the management action frame (for example, the TDLS setup response frame) encapsulated and transmitted in the form of a data frame, it is possible to prevent a difference in recognition between the first QSTA and the second QSTA regarding the completion of the direct link setup procedure.

According to an aspect of this embodiment, the confirm message transmitted in step S43 can include information necessary for allowing the non-AP QSTA to properly perform the QoS facilities and/or HT facilities even though the AP does not support QoS features. The information necessary for the proper QoS facility operation may be, for example, EDCA (Enhanced Distributed Channel Access) parameter set information element. In this case, the EDCA parameter set information element includes a QoS parameter used in a primary channel and/or an secondary channel. The response frame (for example, the TDLS setup response frame) transmitted in step S42 may include information necessary for allowing the non-AP QSTA to properly perform the QoS facility operation as needed.

Figure 9:
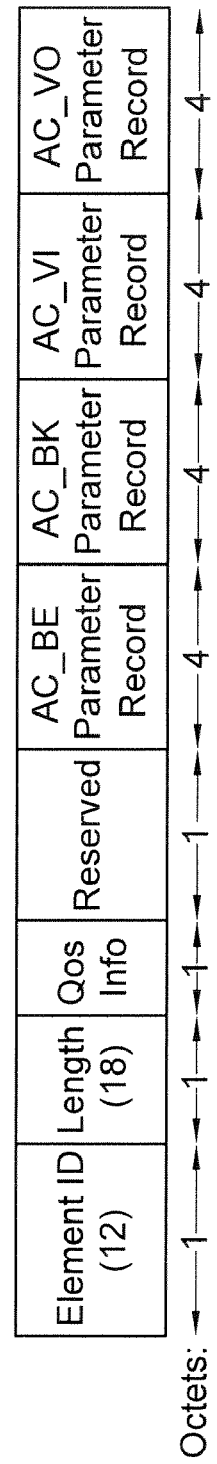
FIG. 9 is a diagram illustrating a format of an EDCA parameter set information element.

FIG. 9 is a diagram illustrating a format of the EDCA parameter set information element. Referring to FIG. 9, the EDCA parameter set information element includes an element ID field, a length field, a QoS information field, and parameter record fields by access categories (AC_BE Parameter Record, AC_BK Parameter Record, AC_VI Parameter Record, and AC_VO Parameter Record). The element ID field is set to a value indicating that the corresponding element is the EDCA parameter set information element. The length field is set to a value indicating the length of the corresponding element. The QoS information field includes plural bit fields indicating the QoS facility information of the transmitting STA.

Figure 10:
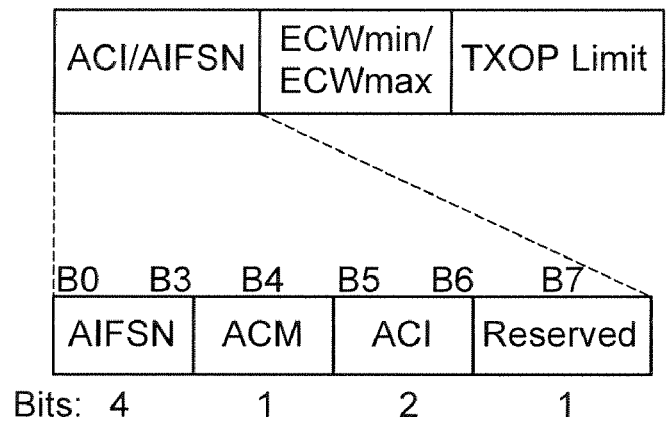
FIG. 10 is a diagram illustrating a format of a parameter record field.

The formats of the parameter record fields by access categories may be equal to each other and an example thereof is shown in FIG. 10. Referring to FIG. 10, the AC_BE Parameter Record field, the AC_BK Parameter Record field, the AC_VI Parameter Record field, or the AC_VO Parameter Record field includes an ACI/AIFSN (Access Category Index/Arbitration InterFrame Space Number) subfield, an ECWmin/ECWmax subfield, and a TXOP limit subfield. The ACI/AIFSN subfield includes an AIFSN bit field, an ACM (Admission Control Mandatory) bit field, and an ACI bit field. according to this embodiment, the ACM bit field can be set to "0", which means that no admission control is included in the corresponding access category.

According to this embodiment, the first QSTA can notify the second QSTA as the peer STA of the QoS parameter using the EDCA parameter set information element. Accordingly, when the first QSTA and the second QSTA exchange data through the setup direct link, it is possible to make communication supporting the QoS with reference to the QoS parameter.

According to another aspect of this embodiment, the confirm frame transmitted in step S43 may additionally include information necessary for efficiently using plural sub channels. The information necessary for efficiently using the plural (for example, two) sub channels may be HT Operation information element defined in the standard of IEEE 802.11n. HT Operation information element includes the parameters (e.g., secondary channel offset parameter) for enabling HT capability of Non-AP QSTA even though AP does not support HT features. However, the embodiment of the invention is not limited to two sub channels, but may be similarly applied to a WLAN system employing three or more sub channels. In this case, the response frame (for example, the TDLS setup response frame) transmitted in step S42 may include the information necessary for efficiently using the plural sub channels.

According to this embodiment, the non-AP QSTA intending to set up a direct link can provide the information on the secondary sub channels to the peer non-AP QSTA, in addition to the primary sub channel. Accordingly, the non-AP QSTA having set up the direct link in the TDLS wireless network can use the primary sub-channel and the second sub-channel in the communication through the direct link, or can use only the secondary sub-channel, thereby enhancing the efficiency for using radio resources.

Figure 11:
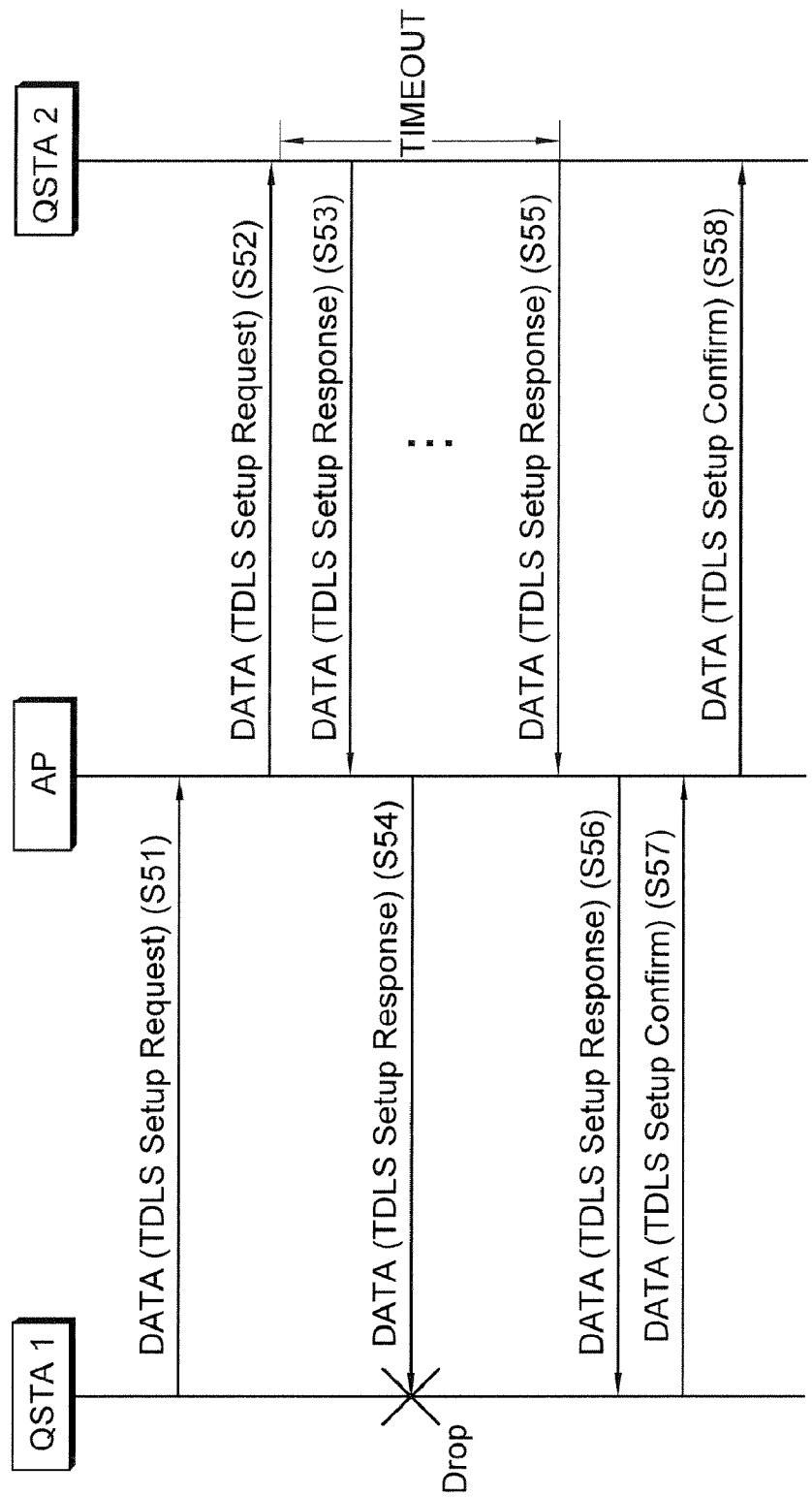
FIG. 11 is a timing diagram illustrating the direct link setup procedure shown in FIG. 5.

FIG. 11 is a timing diagram illustrating the direct link setup procedure shown in FIG. 5. Referring to FIG. 11, the first QSTA transmits the TDLS setup request frame encapsulated in the form of a data frame to the AP (S51). The AP transmits the received TDLS setup request frame to the second QSTA (S52). Steps S51 and S52 correspond to step S41 of FIG. 5.

When the second QSTA transmits the TDLS setup response frame encapsulated in the form of a data frame to the AP (S53), the AP tries to transmit the received TDLS setup response frame to the first QSTA (S54). However, in the example shown in FIG. 11, the TDLS setup response frame to be transmitted by the AP in step S54 is not successfully transmitted to the first QSTA. In this case, according to the first embodiment of the invention employing the three-way handshake procedure, the second QSTA not receiving the confirm frame, for example, the TDLS setup confirm frame, from the first QSTA for a predetermined time recognizes that the direct link setup procedure is not successfully completed. In this case, the second QSTA determines that the TDLS setup response frame transmitted therefrom is not successfully transmitted to the first QSTA and then may transmit the TDLS setup response frame to the AP again (S55). The re-transmission of the TDLS setup response frame may be repeatedly performed when the second QSTA does not receive the TDLS setup confirm frame for a predetermined time (for example, the period of time represented by "TIMEOUT" in FIG. 10). The AP transmits the re-transmitted TDLS setup response frame to the first QSTA again (S56). Steps S53 to S56 correspond to step S42 in FIG. 5.

The first QSTA having received the TDLS setup response frame transmits the confirm frame, for example, the TDLS setup confirm frame, to the AP (S57). Then, the AP transmits the received TDLS setup confirm frame to the second QSTA (S58). Steps S57 and S58 correspond to step S43 in FIG. 5. The direct link setup procedure in the TDLS wireless network is ended with the successful transmission of the TDLS setup confirm frame. As described above, according to this embodiment, the TDLS setup confirm frame further includes the EDCA parameter set information element and may further include the HT operation information element (e.g., secondary channel offset element).

Figure 12:
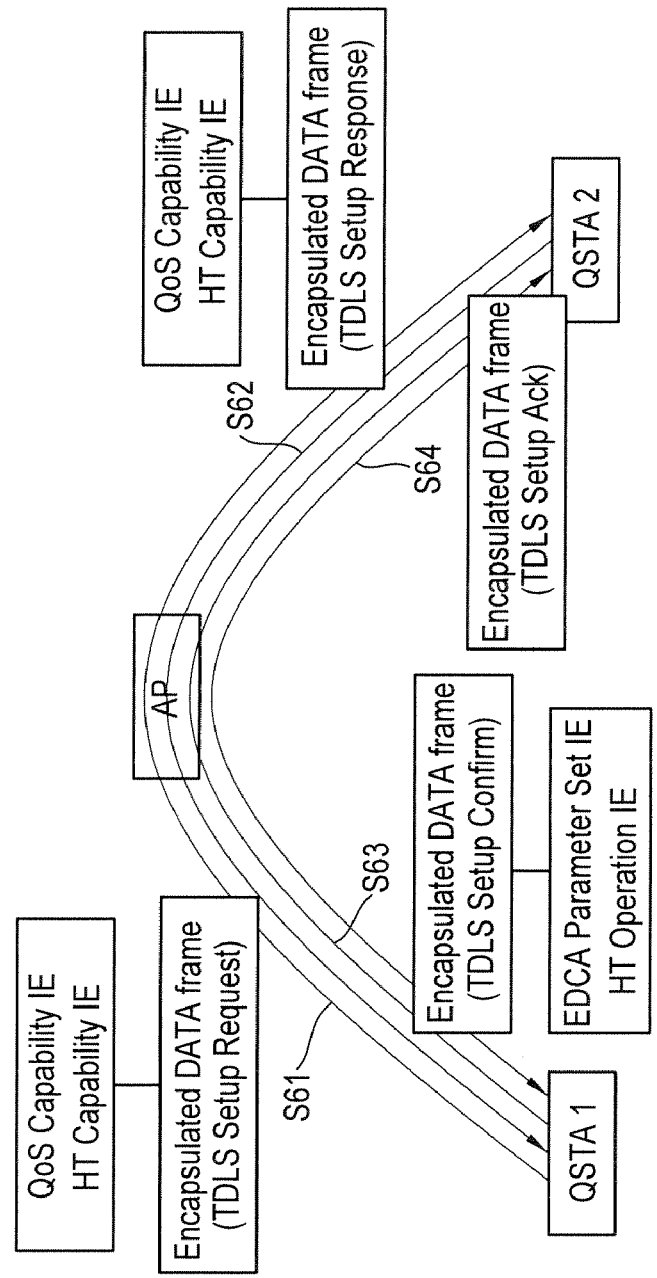
FIG. 12 is a diagram illustrating a flow of messages in a direct link setup procedure in a TDLS wireless network according to a second embodiment of the invention.

FIG. 12 is a diagram illustrating a flow of messages in a direct link setup procedure in the TDLS wireless network according to the second embodiment of the invention. The second embodiment is different from the first embodiment, in that a four-way handshake procedure further including a step of allowing the second QSTA to transmit an acknowledgement message, for example, a TDLS acknowledgement frame, to the first QSTA in addition to the three-way handshake according to the first embodiment. The second embodiment centered on the differences from the first embodiment will be described now.

Referring to FIG. 12, the first QSTA intending to set up a direct link to the second QSTA transmits a message for requesting for setting up the direct link, for example, the TDLS setup request frame, to the second QSTA through the AP (S61). The second QSTA having received the TDLS setup request frame transmits the TDLS setup response frame to the first QSTA through the AP in response to the TDLS setup request frame (S62). The first QSTA transmits a confirm message responsive to the received TDLS setup response frame, for example, the TDLS setup confirm frame, to the second QSTA through the AP (S63). The second QSTA transmits an acknowledgement message, for example, the TDLS acknowledgement frame, to the first QSTA through the AP in response to the received TDLS setup confirm frame (S64). In this embodiment, by additionally performing the process of step S64 in addition to the first embodiment to set up the direct link, it is possible to further enhance the reliability of the direct link setup procedure.

According to above-described embodiments of the present invention, it is possible to enhance the reliability of the direct link setup procedure in a TDLS wireless network. Particularly, it is possible to prevent a difference between recognitions of two non-AP QSTAs regarding the completion of the direct link setup procedure, thereby guaranteeing consistency in completion of the procedure between the two non-AP QSTAs.

In addition, according to other embodiment of the present invention, it is possible for the QoS capabilities and/or the HT capabilities of the non-AP QSTAs having established the direct link therebetween in TDLS wireless network to properly operate in a communication between the non-AP QSTAs.

The embodiments described above in detail are only examples for showing the technical spirit of the invention and thus the technical spirit of the invention should not be understood to be limited to the embodiments. The scope of the invention is specified by only the appended claims.

What is claimed is:

1. A method for establishing a tunneled direct link, the method performed by an initiating station communicating with an intended responding station and comprising:
    transmitting a tunneled direct link setup (TDLS) request frame via an access point (AP), the TDLS request frame including capability information elements related to quality of service (QoS) capability and High Throughput (HT) capability, and link identifier elements including a basic service set identifier (BSSID) field with which the initiating station is associated, an initiating station address field, and an intended responding station address field;
    receiving a TDLS response frame via the AP in response to the TDLS request frame, the TDLS response frame including the capability information elements related to the QoS capability and the HT capability, and the link identifier elements including the BSSID field, the initiating station address field, and the intended responding station address field; and
    transmitting a TDLS confirm frame via the AP in response to the TDLS response frame, the TDLS confirm frame comprising:
        an enhanced distributed channel access (EDCA) parameter set information element used for a direct link between the initiating station and the intended responding station and including a QOS information field and four parameter record fields that each have a length of four octets;
        an HT operation information element; and
        the link identifier elements including the BSSID field, the initiating station address field, and the intended responding station address field.

2. The method of claim 1, wherein:
    the direct link is a primary channel or a secondary channel;
    the primary channel is a path via the AP between the initiating station and the intended responding station; and
    the primary channel and the secondary channel are different paths.

3. The method of claim 1, wherein the HT operation information element includes a secondary channel offset element.

4. An initiating station communicating with an intended responding station in order to establish a tunneled direct link, the initiating station comprising:
    a radio frequency unit configured to receive and transmit a signal; and
    a processor coupled to the radio frequency unit and configured to:
        transmit a tunneled direct link setup (TDLS) request frame via an access point (AP), the TDLS request frame including capability information elements related to quality of service (QoS) capability and High Throughput (HT) capability, and link identifier elements including a basic service set identifier (BSSID) field with which the initiating station is associated, an initiating station address field, and an intended responding station address field receive a TDLS response frame via the AP in response to the TDLS request frame, the TDLS response frame including the capability information elements related to the QoS capability and the HT capability, and the link identifier elements including the BSSID field, the initiating station address field, and the intended responding station address field; and transmit a TDLS confirm frame via the AP in response to the TDLS response frame, the TDLS confirm frame comprising:

an enhanced distributed channel access (EDCA) parameter set information element used for a direct link between the initiating station and the intended responding station and including a QOS information field and four parameter record fields that each have a length of four octets;

an HT operation information element; and the link identifier elements including the BSSID field, the initiating station address field, and the intended responding station address field.

5. The initiating station of claim 4, wherein:

the direct link is a primary channel or a secondary channel;

the primary channel is a path between the initiating station and the intended responding station via the AP; and the primary channel and the secondary channel are different paths.

6. The initiating station of claim 4, wherein the HT operation information element includes a secondary channel offset element.

* * * * *